Nov. 7, 1950             H. E. LAWSON             2,528,891
PRIMARY BATTERY DEPOLARIZER AND
METHOD OF MAKING THE SAME
Filed March 26, 1945
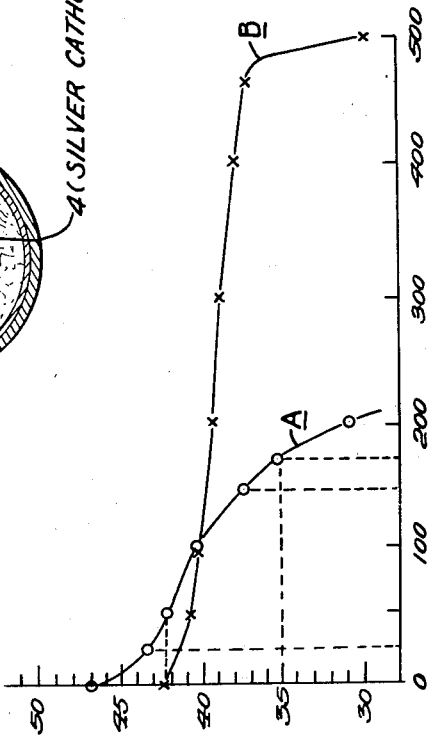
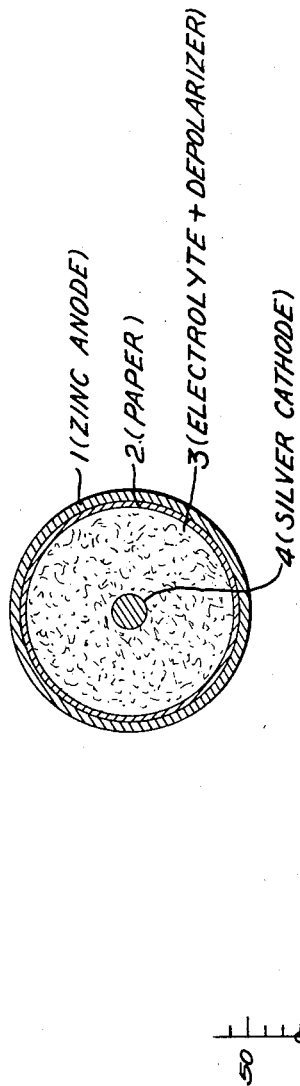
Inventor
H. E. LAWSON,
By Leech & Radue
Attorneys Patented Nov. 7, 1950

2,528,891

UNITED STATES PATENT OFFICE 2,528,891

PRIMARY BATTERY DEPOLARIZER AND METHOD OF MAKING THE SAME

Herbert E. Lawson, Silver Spring, Md.

Application March 26, 1945, Serial No. 584,889

4 Claims. (Cl. 136—137)

This invention relates to depolarizing materials for use in voltaic cells, and particularly primary batteries of the dry cell type, together with a method of preparing such depolarizing materials. The use of depolarizers in electric batteries was one of the early developments in the battery art and many substances have been proposed for this purpose, but only oxides of manganese and copper have been used to any great extent in commercial primary batteries.

The object of the present invention is to procure new materials which have marked advantages over previously suggested depolarizing agents; specifically the invention makes use of silver oxides possessing higher oxygen content than normal $Ag_2O$, and more specifically it makes use of silver peroxide the formula of which is not definitely established, but which is considered to be at least in part AgO. It is well known that oxidizing agents, to be suitable for use as depolarizers in electric cells of the modern dry cell type, must possess certain chemical and physical properties. They must be substantially insoluble in the electrolyte solution used in the cell in order to avoid deterioration in depolarizing capacity and to prevent any action with the zinc or other electrode. They should have high percentages of available oxygen and when mixed with the graphite or other filling agent used in the cell, they should possess the ability of absorbing considerable volumes of the electrolyte solution. The present depolarizer does not have to be combined with absorbent filler or other conductive matter as it possesses inherent conducting and absorptive properties.

Workers in the art appreciate that a proper depolarizer must be an oxidizing agent which readily gives up its oxygen, whereby the released oxygen combines with the hydrogen liberated on the positive plate, as this accumulation of hydrogen on the positive plate reduces the surface of the positive plate to such an extent that the voltage falls and the internal resistance of the cell increases.

My observations have clearly indicated that an efficient and readily procurable depolarizing agent is produced by using silver oxides possessing a higher oxygen content than normal silver oxide $Ag_2O$.

Silver oxides possessing higher oxygen content than normal $Ag_2O$ for this use may be readily manufactured by the following novel method:

Electrolysis of a solution of a soluble silver salt using an insoluble anode (example 50% AgF in water, room temperature, 7 amps. for platinum anode of 5 inches of $\frac{1}{16}$ in. diameter wire. Add $Ag_2CO_3$ to keep pH around 4) and treatment of the black needles that form on the anode with a caustic alkaline solution such as 50% KOH until gassing ceases and equilibrium is obtained. Silver salts that have been used with success are: $AgNO_3$, $AgClO_4$, AgF, $AgBF_4$. The initial product in the case of the nitrate has been reported in the literature as having the composition:

$$4AgO.AgNO_3.H_2O \text{ or } 4Ag_2O_5.2AgNO_3.H_2O$$

Some of the other formulas which have been suggested for the electrolysis product of silver nitrate in aqueous solution are: $Ag_2O_3$; $Ag_3O_4$; $Ag_4O_5.AgNO_3$; $2Ag_2O_2.AgNO_3.H_2O$, etc., according to a paper presented by Mortimer J. Brown September 29, 1916, at a meeting of the American Electrochemical Society. Whatever the composition, after the KOH treatment some oxygen has been removed, the nitrate has been eliminated and the grey powder that is left is a composition utilizing silver oxides possessing higher oxygen content than normal $Ag_2O$, and also including silver peroxide AgO, this composition also sometimes being considered to be $Ag_2O_2$; $Ag_4O_4$; $Ag_2O.Ag_2O_3$; or $Ag(AgO_2)$.

The silver oxides possessing higher oxygen content than normal $Ag_2O$ as manufactured by this process are preferably moistened with an alkali solution, such as 50% of potassium hydroxide and used in a primary dry cell in the manner of conventional depolarizers. A cell having a zinc anode and a silver cathode using such an electrolyte delivers the theoretical amount of charge at phenomenally heavy current drains and voltages of from 1.2 to 1.8 volts. The reactions that produce the current in such a cell appear to be as follows:

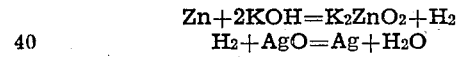
$$Zn+2KOH=K_2ZnO_2+H_2$$
$$H_2+AgO=Ag+H_2O$$

A further advantage in using silver oxides possessing higher oxygen content than normal $Ag_2O$ as a depolarizer in dry cells is that no added conductive matter, such as carbon or graphite, need be included in the electrolyte absorbing mix, as the silver compound is conductive. It will be understood that other metals, such as aluminum, may be used instead of zinc, and iron, carbon and many heavy metals may be used instead of silver as the positive pole against which the silver compound is packed. Potassium hydroxide has proved to be an excellent electrolyte although other electrolytes such as sodium hydroxide and lithium hydroxide may be used.

In the accompanying drawing, Figure 1 is a graphical representation of the discharge characteristics of a conventional cell and of a cell constructed in accordance with the present invention, and Figure 2 is a sectional view of a primary cell constructed in accordance with the present invention.

In Figure 1, I show a chart of comparative discharge curves of a conventional cell and that of a cell embodying my invention.

The discharge curve A is that of a standard dry cell for sale in the open market, of the size and type used for "B" radio batteries and having a rated voltage of forty-five volts. This battery is normally used in portable radios and is approximately 1⅝ x 3 1/32 x 3⅛ inches overall dimensions with thirty individual primary cells making up the battery unit. My equivalent battery is based on the same number of cells and same weight of depolarizing mix. As graphically shown by curve A of the chart, the standard dry cell has slightly less than its rated voltage and on continuous discharge at a drain of 2 mils (0.002 amp.) falls off very rapidly and lasts only 200 hours. Inspection of curve B, representing the discharge characteristic of my equivalent cell, reveals that the improved cell using the new mixture of silver oxides as a depolarizer maintains a substantially level discharge curve until well over 400 hours. As before stated, both batteries have approximately the same weight of depolarizer mix. The improved cell was made with a zinc anode 1, the conventional moist paper layer 2 and a depolarizing layer 3 composed of the mixture of silver oxide and potassium hydroxide with a silver cathode 4. The depolarizer consists of a paste of the mixture of silver oxides (in which the AgF deposit of black needles was aged three weeks in 50% potassium hydroxide) with a 50% solution of potassium hydroxide in water saturated with LiOH so that the resulting mix paste is approximately 50% AgO, 25% KOH, 3.25% LiOH and 21.75% $H_2O$. The oxide mixture was prepared in accordance with the method set forth above.

While the chemistry of the formation and action of the depolarizer made by this process is not fully understood, it is believed that the material is a mixture of silver oxide ($Ag_2O$) and silver peroxide (AgO), the silver oxide being in sufficient quantity and the material in such a condition that the electrolytic potential is that of silver oxide (which substantially eliminates any sharp drop in the voltage curve during discharge) while the long life of the depolarizer is phenomenally great by reason of ion transfer from the silver peroxide to the silver oxide to replenish its oxygen content and depolarizing power.

Further, although the preferred process for producing partial decomposition of the electrolytically oxidized soluble silver salt in the desired amount has been described as by leaching in alkali until gas evolution substantially ceases, it is within the scope of my invention to produce such partial decomposition by equivalent methods such as by aging, boiling in water, or by electrolysis with carefully controlled potentials. The important results of long life at substantially constant voltage on discharge are obtained by any of these processes carried to the proper point, although I prefer the caustic leach for the prescribed time because of its ease and quickness.

I claim:

1. A primary cell comprising: an anode; a cathode; a depolarizer of silver oxides formed by electrolytic oxidation of a soluble silver salt in an acid bath having a pH of approximately 4, followed by partial decomposition of the resulting black crystals in an aqueous caustic solution which causes gas evolution until substantial equilibrium is obtained; and an alkaline electrolyte dispersed throughout said depolarizer.

2. A primary cell comprising: a zinc anode; a silver cathode; a depolarizer of silver oxides formed by electrolytic oxidation of a soluble silver salt in an acid bath having a pH of approximately 4, followed by partial decomposition of the resulting black crystals in an aqueous potassium hydroxide solution which causes gas evolution until substantial equilibrium is obtained; and an alkaline electrolyte dispersed throughout said depolarizer.

3. A primary cell comprising: an anode; a cathode; a depolarizer of silver oxides formed by electrolytic oxidation of a soluble silver salt in an acid bath having a pH of approximately 4, followed by partial decomposition of the resulting black crystals in an aqueous alkali metal hydroxide solution which causes gas evolution until substantial equilibrium is obtained; and an alkaline electrolyte dispersed throughout said depolarizer.

4. A primary cell comprising: an anode; a cathode; a depolarizer of silver oxides formed by electrolytic oxidation of a soluble silver salt in an acid bath having a pH of approximately 4, followed by partial decomposition of the resulting black crystals in a substantially 50% aqueous solution of potassium hydroxide until substantial equilibrium is obtained; and an alkaline electrolyte dispersed throughout said depolarizer.

HERBERT E. LAWSON.

REFERENCES CITED

The following references are of record in the file of this patent:

UNITED STATES PATENTS

| Number | Name | Date |
|---|---|---|
| 692,298 | Jungner | Feb. 4, 1902 |
| 1,195,677 | Heil | Aug. 22, 1916 |
| 2,317,711 | Andre | Apr. 27, 1943 |

FOREIGN PATENTS

| Number | Country | Date |
|---|---|---|
| 29,138 | Great Britain | of 1904 |
| 335,587 | Great Britain | Sept. 29, 1930 |

OTHER REFERENCES

Mellor, J. W., Inorganic and Theoretical Chemistry vol. 3 (1923), page 482.

A Comprehensive Treatise on Inorganic and Theoretical Chemistry, by J. W. Mellor, pub. by Longmous Green & Co., New York, 1923, vol. III. Pages 386 and 388.

Transactions of the American Electrochemical Society, vol. 30 (1916). Pages 327, 328, 329 and 330 of an article by M. J. Brown on "A New Method for the Study of Silver Peroxynitrate."

Transactions of the American Electrochemical Society, vol. 32 (1917), pages 393–401 of an article by H. C. P. Weber on Silver Peroxide and Valence of Silver.